United States Patent [19]
Pandya

[11] Patent Number: 5,623,683
[45] Date of Patent: Apr. 22, 1997

[54] TWO STAGE BINARY MULTIPLIER

[75] Inventor: Ashish Pandya, Chandler, Ariz.

[73] Assignee: Intel Corporation, Santa Clara, Calif.

[21] Appl. No.: 998,382

[22] Filed: Dec. 30, 1992

[51] Int. Cl.$^6$ .................................................. G06F 15/00
[52] U.S. Cl. ..................... 395/800; 364/736; 364/754; 364/760
[58] Field of Search ..................... 395/800; 364/736, 364/754, 760

[56] References Cited

U.S. PATENT DOCUMENTS

| | | | |
|---|---|---|---|
| 4,228,520 | 10/1980 | Letteney et al. | 364/760 |
| 4,769,779 | 9/1988 | Chang et al. | 364/754 |
| 4,771,379 | 9/1988 | Ando et al. | 395/800 |
| 4,852,037 | 7/1989 | Aoki | 364/736 |
| 4,910,701 | 3/1990 | Gibbons et al. | 364/760 |
| 4,958,312 | 9/1990 | Ang et al. | 364/754 |
| 5,144,574 | 9/1992 | Morita | 364/746 |
| 5,153,848 | 10/1992 | Elkind et al. | 364/748 |
| 5,262,976 | 11/1993 | Young et al. | 364/760 |

Primary Examiner—Eric Coleman
Assistant Examiner—John Follansbee
Attorney, Agent, or Firm—Blakely, Sokoloff, Taylor & Zafman

[57] ABSTRACT

The present invention provides a method and apparatus for achieving m-bit×m-bit multiplication in two states with a minimum amount of hardware. The invention multiplies an m-bit multiplicand A by an m-bit multiplier B to produce a 2m-bit final product A×B. The multiplicand A has a most significant m/2 bits denoted by $A_H$ and a least significant m/2 bits denoted by $A_L$. The multiplier B has a most significant m/2 bits denoted by $B_H$ and a least significant m/2 bits denoted by $B_L$. By adding the least significant m/2 bits of $B_H×A_L$ to the middle m/2 bits of the product $B_L×A$, the invention produces a number having a least significant m bits that are the least significant m bits of the final product during a first pass. The most significant m bits of the final product are produced during a second pass. Using this technique, the invention produces the final product in two states with substantially less hardware than current systems.

34 Claims, 9 Drawing Sheets

Figure 1
(PRIOR ART)

(PRIOR ART)

Figure 8 m-BIT x m/2-BIT MULTIPLIER (2-STATE)

TWO STAGE BINARY MULTIPLIER

BACKGROUND OF THE INVENTION

1. Field of the Invention

The present invention relates to the field of computer arithmetic, and in particular to a method and apparatus for efficient binary multiplication.

2. Art Background

A number of techniques and algorithms exist for performing multiplication in software and computer hardware. With the growth of applications requiring fast multiplication, computer designers have found it necessary to turn to hardware solutions to implement multiplication. However, fast multiplication is a very hardware intensive operation, requiring a large number of devices that occupy a sizable amount of real estate in an integrated circuit. Thus, it is a goal of the computer designer to achieve fast multiplication using the smallest number of devices necessary.

Figure 1:
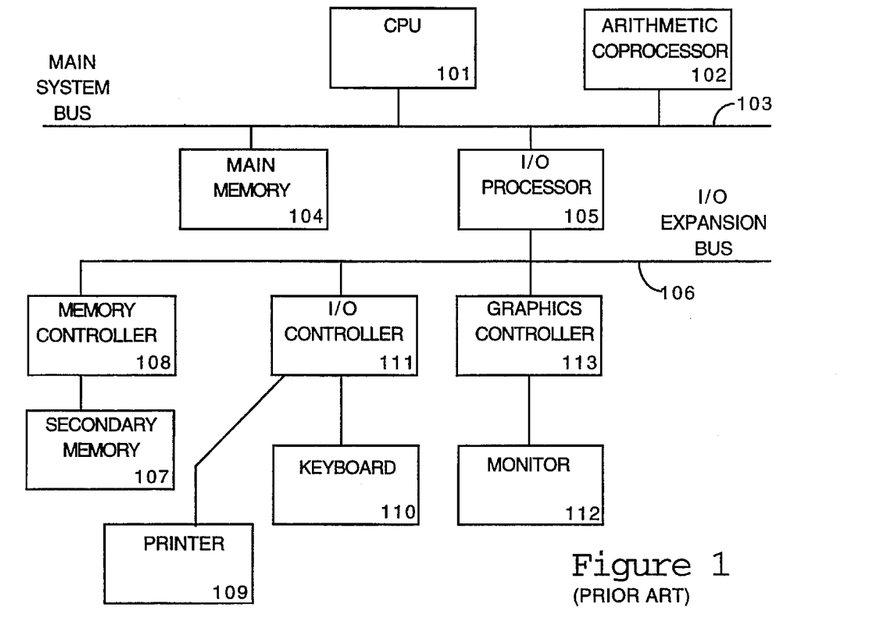
FIG. 1 is a block diagram of a typical computer system.

Many components of a computer system would benefit from smaller fast multipliers. FIG. 1 is a standard block diagram of a computer system including a CPU 101 and an arithmetic coprocessor 102. A main system bus 103 links processors 101 and 102 to each other and to a main memory 104 and an I/O processor 105. The I/O processor 105 links the processing units 101 and 102 and the main memory 104 through an I/O expansion bus 106 to various I/O devices, including a secondary memory 107 through a memory controller 108, a printer 109 and a keyboard 110 through I/O controller 111, and to a monitor 112 through a graphics controller 113.

Figure 2:
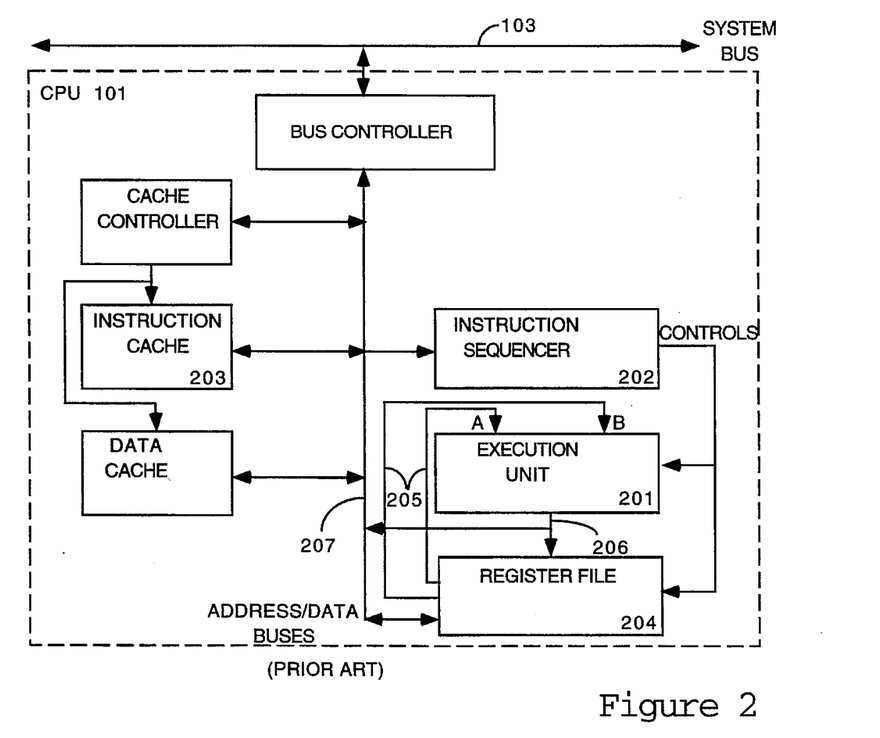
FIG. 2 illustrates the internal structure of the CPU of FIG. 1.

FIG. 2 illustrates CPU 101 in greater detail. An execution unit 201 executes arithmetic operations according to instructions fetched by an instruction sequencer 202 from an instruction cache 203. In a multiplication operation in the CPU, the operands, multiplicand A and multiplier B, are provided to the execution unit 201 by register file 204 over operand buses 205. A result bus 206 carries the result of the arithmetic operation back to register file 204 and to address/data bus 207 for further processing. As is well known in the art, the coprocessor 102 also includes an execution unit.

Figure 3:
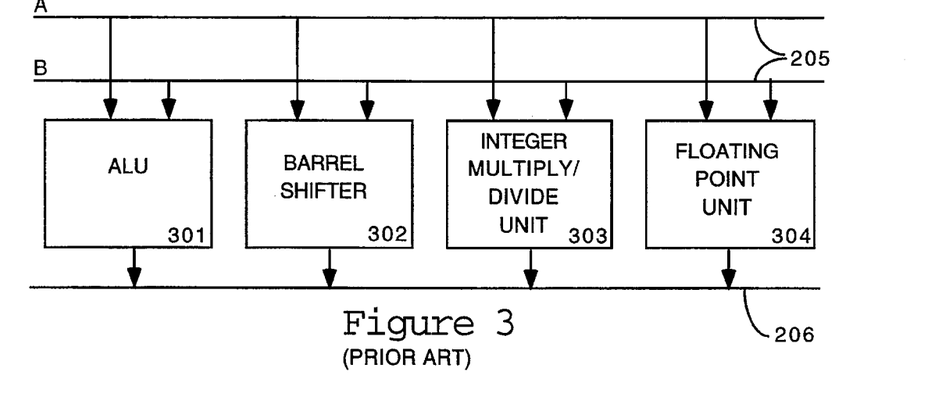
FIG. 3 illustrates the internal structure of the execution unit of the CPU of FIG. 2.

FIG. 3 illustrates the internal structure of the execution unit 201. The execution unit 201 includes an arithmetic logic unit (ALU) 301, a barrel shifter 302, a dedicated integer multiply/divide unit 303 and a dedicated floating point unit 304. The ALU 301 performs basic numerical and logical operations. The barrel shifter 302 is used for the high speed shifting of a binary number to the left or right by a specified number of bits. In particular, the barrel shifter 302 is used to align the mantissas of floating point numbers and to normalize the exponent of their sum during addition and multiplication operations. The integer multiply/divide unit 303, as the name implies, performs integer multiplication and division, and the floating point unit 304 executes floating point operations. All of the execution unit components are linked to the operand buses 205 and the result bus 206.

In the execution unit 201 of the CPU 101, multiplication takes place in the ALU 301, the integer multiply/divide unit 303, and in the floating point unit 304 to generate the mantissa portion of the floating point product of two numbers. Similarly, multipliers are also found in the multiplier unit of arithmetic coprocessor 102, and in the graphics controller 113 for pixel address generation.

In all of the above applications, the multiplication process generates a total number of bits in the product equal to the sum of the number of bits of the multiplicand A and the multiplier B. However, for the other arithmetic and logic operations the number of bits in the result often equals the number of bits in each of the operands. Thus, in the design of the execution unit 201, the width of each of the operands buses 205 is usually the same as the width of the result bus 206. Designers do not include wider result buses to support multiplication operations in order to save space on the silicon of the CPU. Consequently, assuming that the input operands are each m bits wide, the multiplication result is 2 m bits wide, requiring two steps to transfer the result sequentially on to the m-bit result bus 206.

Several multiplier configurations are currently in use to perform fast multiplication. One of the simplest implementations multiplies the multiplicand A by the multiplier B one bit at a time and adds the resulting terms. For example, for two m=4-bit binary numbers A=1010 and B=1101,

```
      1010
      1101
      ----
      1010
      0000
     1010
    1010
   --------
   10000010
```

This simple algorithm is inefficient in that the four 1-bit products must be stored until the final addition step is completed. In machine implementations, it is thus desirable to add each one bit product as it is generated to the sum of the preceding terms to form a number called the partial product. Using this simple algorithm, m=4 partial products are generated when multiplying two m=4-bit numbers. As is well known in the art, the addition of the partial products is normally carried out using a Wallace tree comprised of carry-save adders to minimize the delay involved in obtaining the final product.

To reduce the hardware complexity of the multiplication operation, designers typically use the radix-4 modified Booth recoding algorithm. This algorithm produces m/2 partial products, thus requiring half the number of components for m-bit×m-bit multiplication than the simple algorithm described above. Multiplication using modified Booth recoding is very well known in the art and is described in J. P. Hayes, *Computer Architecture and Organization*, McGraw-Hill Publishing Co., 241–250 (1988), and J. L. Hennessy & D. A. Patterson, *Computer Architecture: A Quantitative Approach*, Morgan Kaufmann Publishers Inc., §A.2 (1990).

Figure 4:
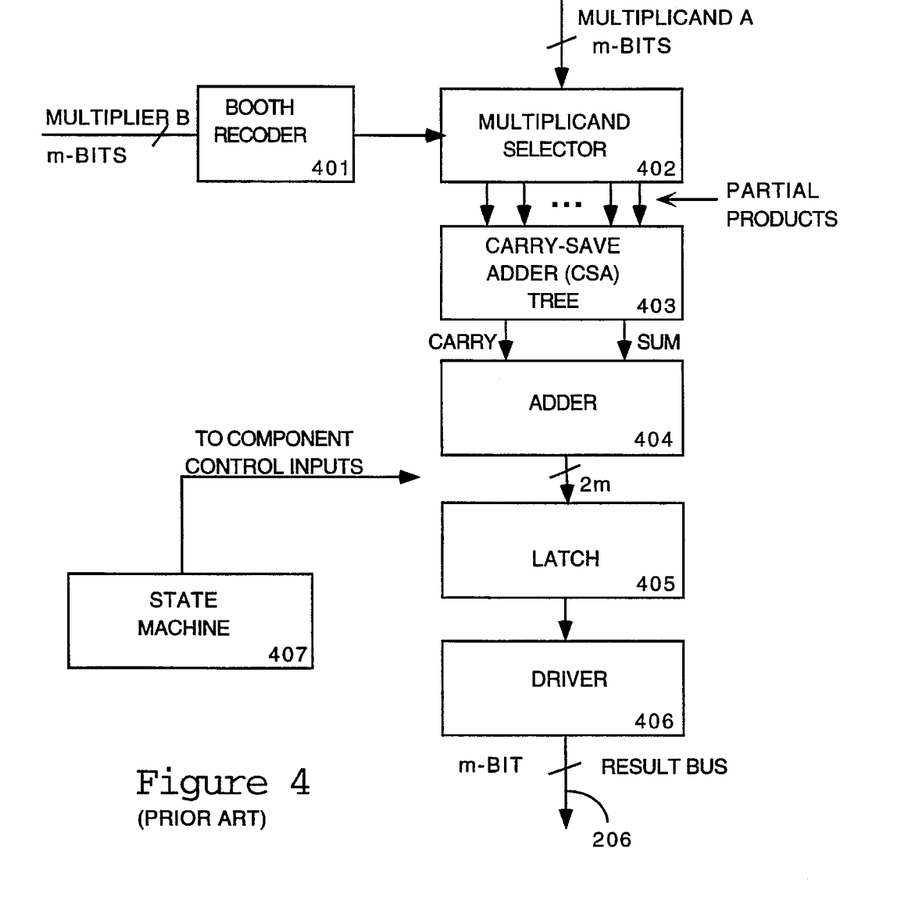
FIG. 4 illustrates a prior art m-bit×m-bit multiplier.

FIG. 4 illustrates an m-bit×m-bit multiplier scheme using modified Booth recoding. In this scheme, a modified Booth recoder 401 recodes an m-bit multiplier B into m/2 groups of three bits each, which are presented to a multiplicand selector 402. The multiplicand selector also receives as an input an m-bit multiplicand A, and produces m/2 partial products. As is well known in the art, the multiplication producing the partial products is accomplished by shifting the multiplicand bits an appropriate number of positions depending on the value of the 3-bit recoded multiplier portion corresponding to each partial product. The partial products are then added using one of several possible conventional adder tree implementations to obtain the final 2 m-bit product in one step. Usually, the adder is implemented as a Wallace tree 403 of carry-save adders. The Wallace tree produces the product in carry-save form as a carry vector C and a sum vector S, which are then added in the final stage of the multiplier using a fast parallel adder 404. Of the 2 m bits of the final product, m bits are stored in a latch 405 and the remaining m bits are dumped on the result bus 206 through a bus driver 406. Because the result bus is only m-bits wide, m bits must be temporarily stored in the latch 405. Note that the logical control of the components of the multiplication apparatus is accomplished by a state machine 407, which issues control signals received by the components, each component having control inputs (not shown) as is obvious to those skilled in the art.

After the first m bits have been dumped on to the result bus 206, the latch releases the remaining m bits and transfers them to the result bus 206. Thus, this multiplier requires only two states to produce the 2 m-bit result. However, the high speed of this multiplier comes at the expense of the need for more hardware than other implementations.

Figure 5:
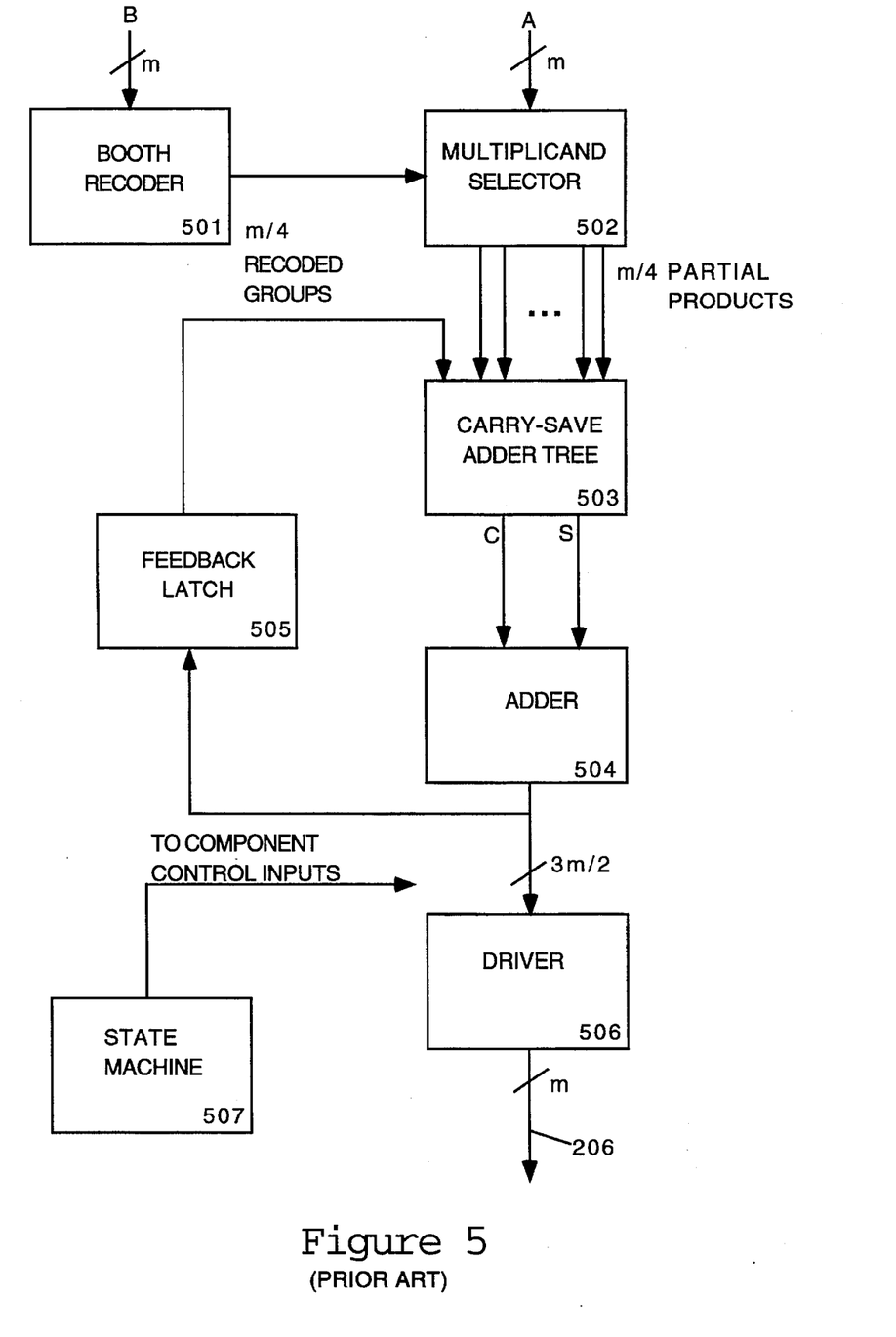
FIG. 5 illustrates a prior art m-bit×m/2 bit iterative multiplier.
Figure 6:
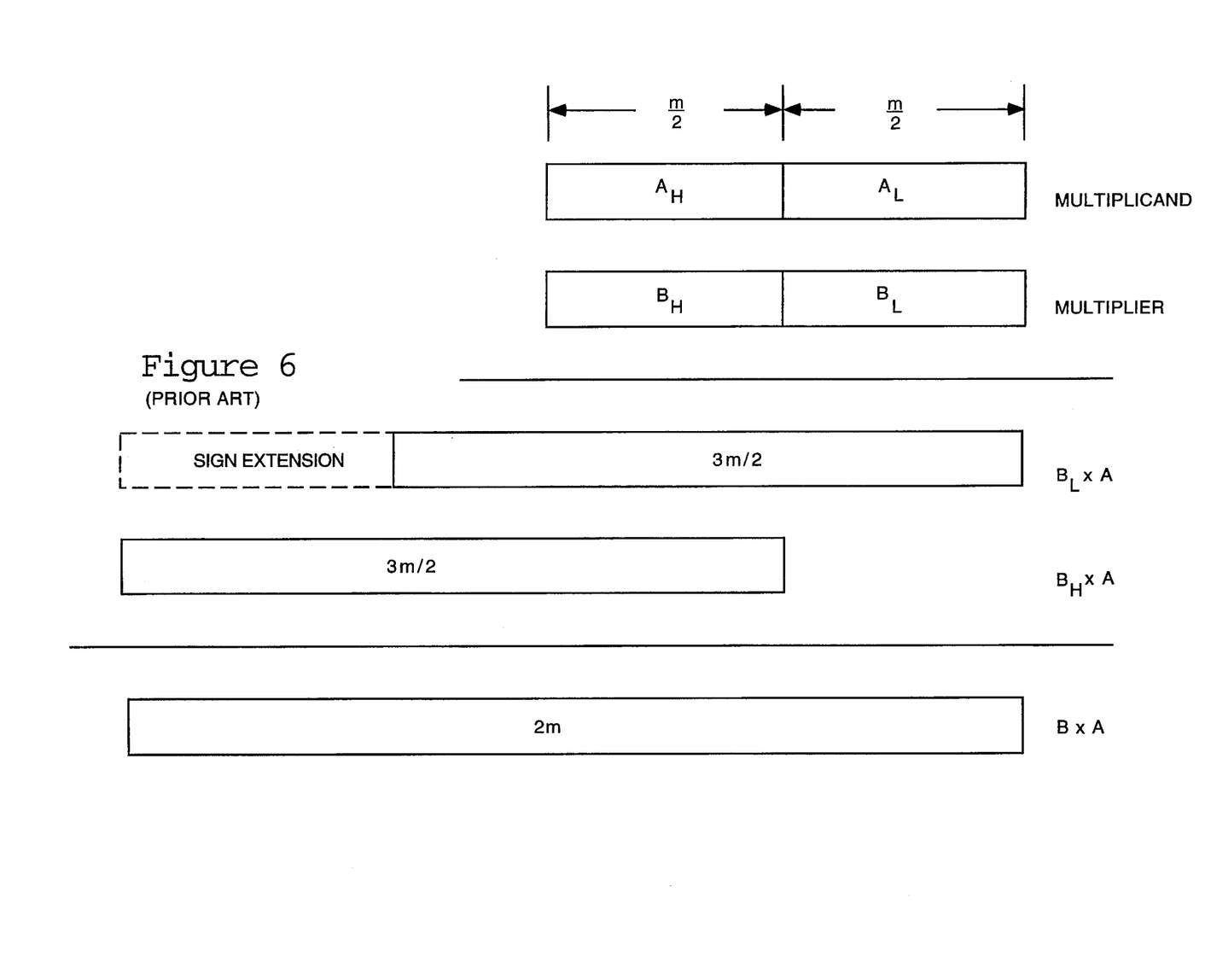
FIG. 6 illustrates the operands and interim results of the multiplier of FIG. 5.

An m-bit×m-bit multiplier may be implemented using fewer components by sacrificing processing speed, as shown in FIGS. 5 and 6. This scheme uses an m-bit×m/2-bit multiplier in an iterative fashion. The Booth recoder 501 is configured to recode only m/4 groups of 3-bits each in two steps. The m/4 recoded groups applied to m-bit multiplicand selector 502 produces m/4 partial products, half the number of partial products produced by the m-bit×m-bit multiplier of FIG. 4. Thus, the number of devices in the carry-save adder tree 503 and in other components are approximately half those used in the implementation of FIG. 4.

Referring to FIG. 6, during a first pass through the multiplier the multiplicand A is multiplied by the least significant m/2 bits of the multiplier $B_L$, producing the first 3 m/2-bit partial product, $B_L \times A$. (Recall that in this configuration only m/2 bits of the multiplier are applied to the m-bit multiplicand, resulting in m/2+m=3 m/2 bits for the interim product.) In a second pass, the multiplicand A is multiplied by the most significant m/2 bits of the multiplier, $B_H$, producing the second 3 m/2-bit partial product, $B_H \times A$, which is shifted left from the first 3 m/2-bit partial product by m/2 bits. These two partial products, when added together, produce the final 2 m-bit product.

The least significant m/2 bits of the final product are the same as those of the first partial product, and are thus valid bits produced during the first pass. However, the most significant m-bits of the first partial product must be added to the appropriate bits of the second partial product to obtain the remaining 3 m/2 valid bits of the final product. Thus, in the implementation of FIG. 5, the most significant m-bits of the first partial product $B_L \times A$ are fed back through a feedback latch 505 into the adder tree 503 during the second state, where they are added to the second partial product, $B_H \times A$. Note that before adding the most significant m bits of the first partial product to the second partial product, the first partial product must be sign extended by m/2 bits to obtain the correct result. The sign extension depends on the sign (most significant bit) of $B_L \times A$, the first partial product. If $B_L \times A$ is positive (MSB=0), then the sign extension consists of m/2 bits of value "0". Conversely, if $B_L \times A$ is negative (MSB=1), then the first partial product is extended by m/2 "1"bits. Sign extension takes place in the feedback latch 505.

The resulting carry and save words of the tree 503 are added in parallel adder 504 to produce 3 m/2 valid bits in the second state. However, due to the fact that the bus width is limited to m-bits, the implementation requires an additional state to transfer all 2 m bits of the final product to the result bus 206 through bus driver 506. Consequently, although this implementation requires less hardware than the full m-bit× m-bit multiplier of FIG. 4, this technique requires three states to perform the multiplication.

Figure 7:
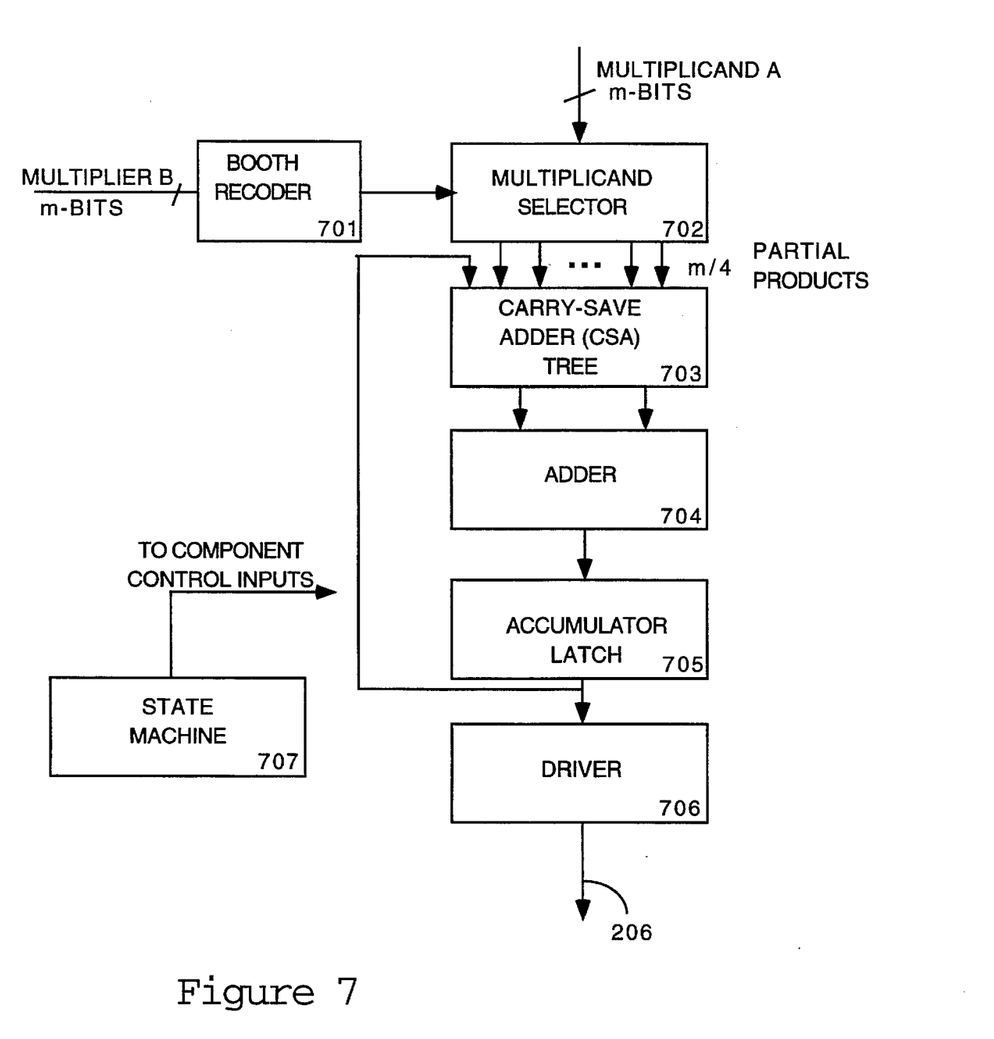
FIG. 7 illustrates a prior art m/2-bit×m/2-bit iterative multiplier.

A third existing technique accomplishes m-bit×m-bit multiplication by iteratively using an m/2-bit×m/2-bit multiplier, as shown in FIG. 7. As in the configuration of FIG. 5, a modified Booth recoder 701 recodes half the multiplier bits at a time to produce m/4 recoded groups each time. In addition, in this implementation, the m/4 recoded groups multiply only half the multiplicand bits in multiplicand selector 702 during each pass through the multiplier to produce m/4 partial products with half the number of bits in the partial products than those in the apparatus of FIG. 5. Thus the hardware required by this configuration is approximately half that required by the multiplier of FIG. 5.

During each iteration m/2 valid bits are generated. These m/2 bits can be grouped in an accumulator latch 705 to form two m-bit values to be dumped on the m-bit result bus 206 in two states, or each m/2-bit group can be dumped on the bus in four states. In either case, the total number of states required to generate the final product on the result bus from the time of receiving the input operands is four states. Thus, although this implementation uses less hardware than all of the existing techniques, it operates at half the speed of the multiplier of FIG. 4.

As can be seen from the conventional multiplier implementations, increases in system speed require substantial increases in the number of hardware components, resulting in the use of more area on silicon. Conversely, any attempt to decrease hardware complexity results in an accompanying increase in the number of states necessary to implement multiplication.

SUMMARY OF THE INVENTION

It is, therefore, an object of the present invention to provide a method and apparatus for fast hardware multiplication in two states with a minimum amount of hardware.

The present invention provides a method and apparatus for achieving m bit×m bit multiplication in two states with a minimum amount of hardware. The invention multiplies an m bit multiplicand A by an m bit multiplier B to produce a 2 m-bit final product A×B. The invention produces the least significant m bits of A×B during a first state, and the most significant m bits of A×B during a second state. The multiplicand A has a most significant m/2 bits denoted by $A_H$ and a least significant m/2 bits denoted by $A_L$. The multiplier B has a most significant m/2 bits denoted by $B_H$ and a least significant m/2 bits denoted by $B_L$. A least significant half generator receives $A_L$ and $B_H$, and selects the least significant m/2 bits of the product $A_L \times B_H$ to produce a second product. A feedback latch stores a most significant m bits of a third product as a feedback word. A first multiplier receives the multiplicand A and the multiplier B and in a first state, multiplies A by $B_L$ to produce a first product having 3 m/2 bits. In a second state, the first multiplier multiplies A by $B_H$ to produce a fourth product having 3 m/2 bits. An adder, in the first state, adds the second product to the middle m/2 bits of the first product to produce the third product. The least significant m bits of the third product are the least significant m bits of the final product. In the second state, the adder receives the feedback word from the feedback latch, subtracts the second product from the feedback word to produce a first difference, and adds the fourth product to the first difference to produce a fifth product. The feedback latch is coupled to the adder to receive the most significant m bits of the third product. The most significant m bits of the fifth products are the most significant bits of the final product. The adder is coupled to the feedback latch to receive the feedback word and to the least significant half generator to receive the second product. A state machine is coupled to the least significant half generator, the feedback latch, the first multiplier and the adder, to control the operation of those components in the first and second states.

DETAILED DESCRIPTION OF THE INVENTION

The present invention provides a method and apparatus for achieving fast m-bit×m-bit multiplication with a minimum amount of hardware. The invention constitutes a substantial improvement over the m-bit×m/2-bit multiplier of FIG. 5. A new component is added to the m-bit×m/2-bit implementation to insure that the least significant valid m bits of the final product are produced in a first state and the remaining m-bits of the final 2 m-bit product are produced in a second state.

For purposes of explanation, specific embodiments are set forth to provide a thorough understanding of the present invention. However, it will be apparent to one skilled in the art that the invention may be practiced without these details. In other instances, well known elements, devices, process steps and the like are not set forth in detail in order to avoid unnecessarily obscuring the present invention.

One problem with the prior art m-bit×m/2-bit multiplier is that it generates only m/2 valid bits during the first pass through the multiplier. In order to produce m valid bits during the first pass, conventional methods, such as that of FIG. 4, require a substantial increase in the number of hardware components. The present invention overcomes these drawbacks and stores m valid bits of the final product on the result bus during the first state with only a minimal increase in hardware.

Figure 8:
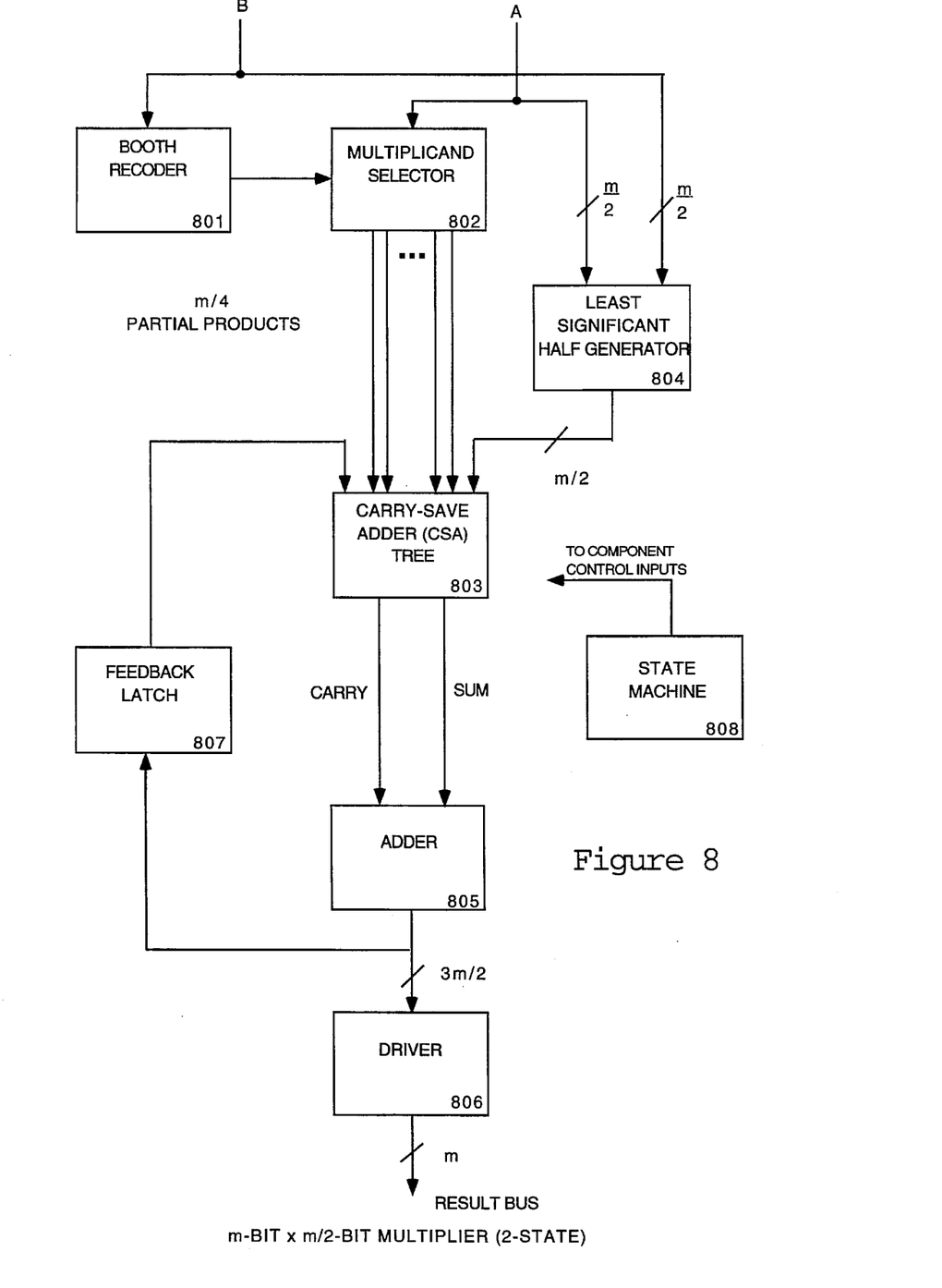
FIG. 8 is a block diagram of the present invention.
Figure 9:
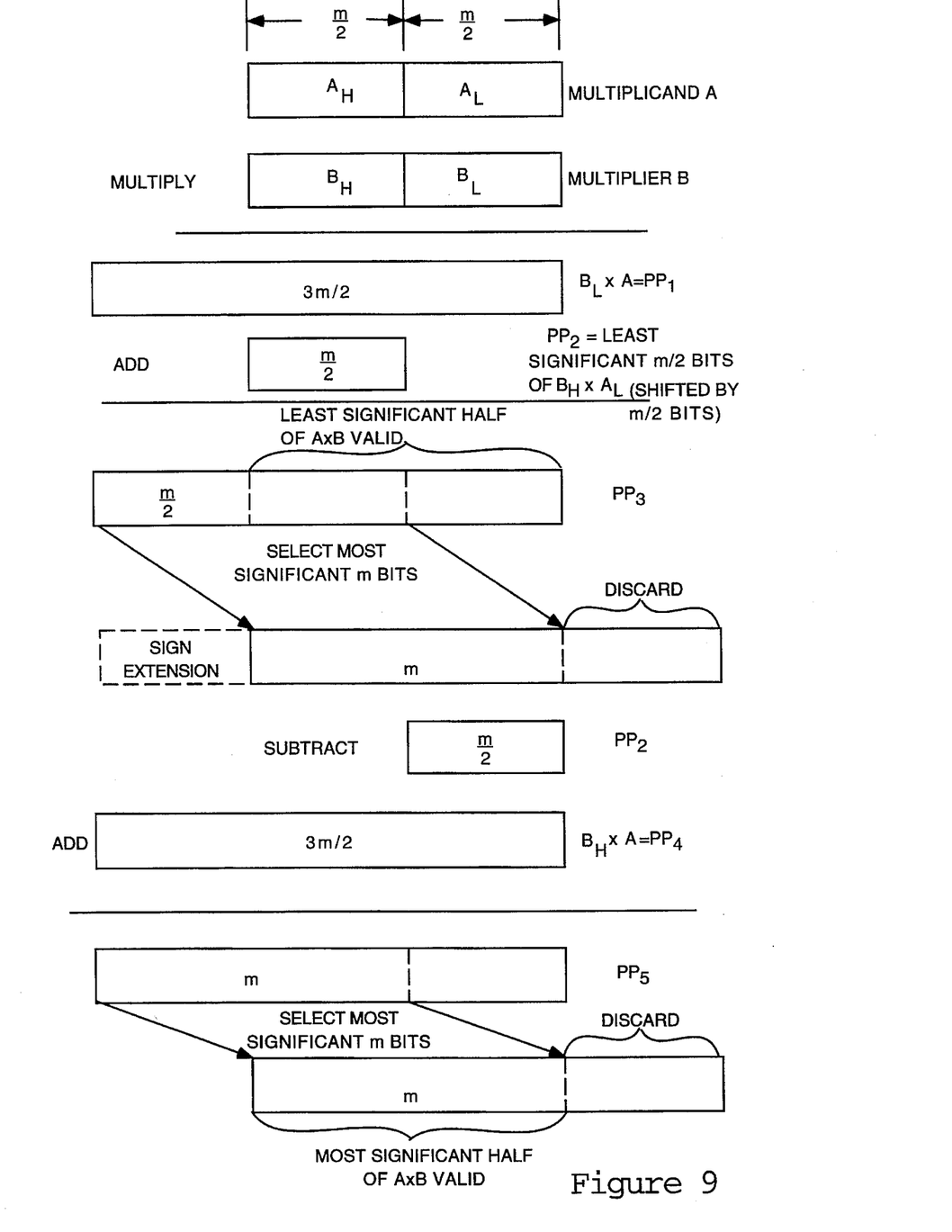
FIG. 9 illustrates the operands and interim results of the present invention.

FIG. 8 is a block diagram illustrating an embodiment of the multiplier of the present invention. FIG. 9 diagrams the multiplication process of the invention in terms of the operands A and B, and the interim and final results of the process. $A_L$ and $A_H$ are the least significant and most significant m/2-bit halves of the multiplicand A, respectively, and $B_L$ and $B_H$ are the least significant and most significant m/2-bit halves of the multiplier B, respectively. This scheme assumes that m is even. However, if m is odd, m can be lengthened to an even number of bits by setting the most significant bit of the multiplicand and the multiplier to "0"(zero). Throughout this description, simultaneous reference is also made to the flow chart of FIG. 10, which illustrates the steps of the multiplication process of the present invention.

Figure 10:
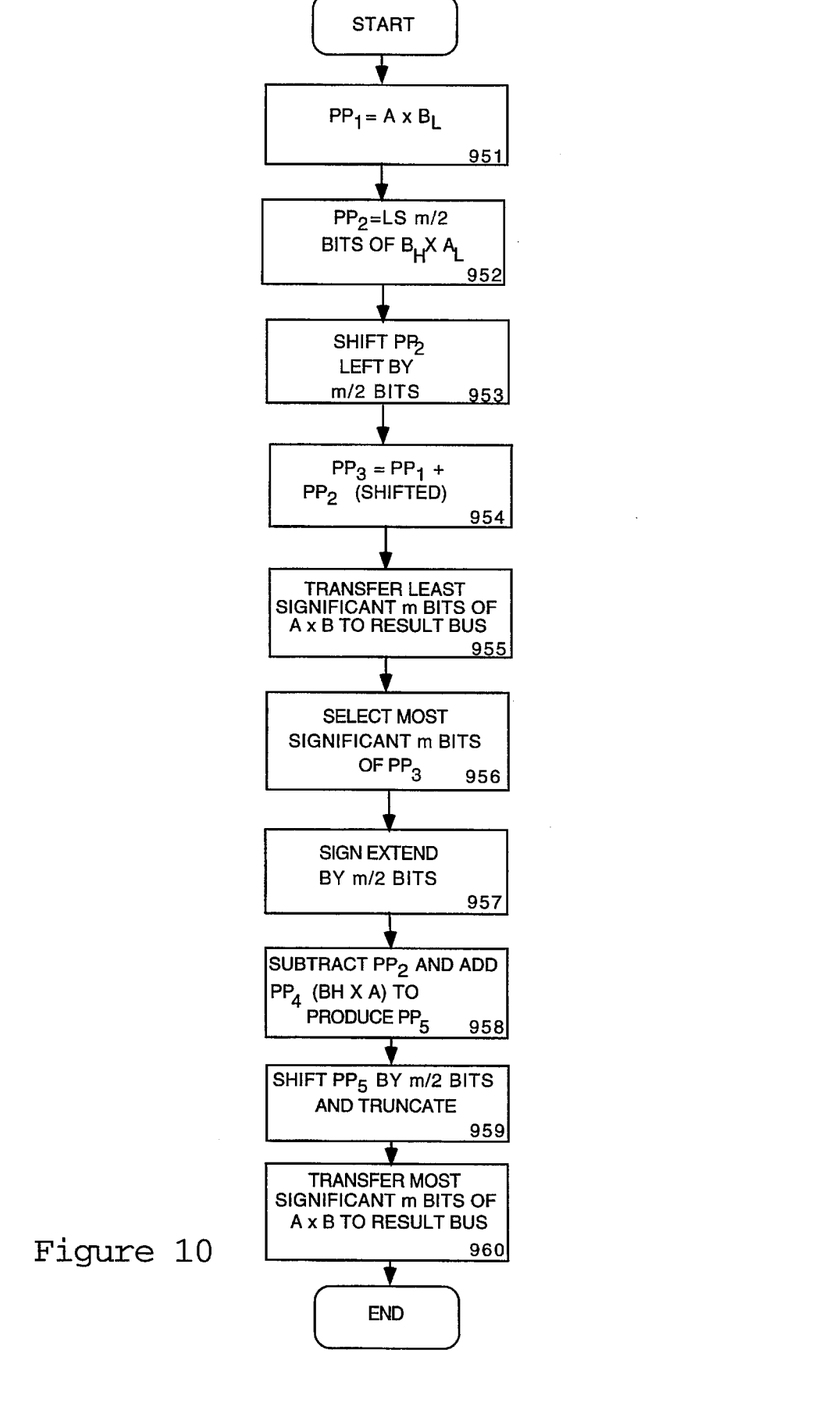
FIG. 10 is a flowchart of the process of the present invention.

Referring to FIGS. 8, 9 and 10, a Booth recoder 801 recodes m/2 bits of the multiplier B during each state of the multiplication process using the modified Booth recoding technique. The recoder forms m/4 recoded groups in each of two states and feeds them into an m-bit multiplicand selector 802 to form m/4 partial products. (Note that the present invention can be applied to any scheme to multiply binary numbers. The use of modified Booth recoding in the description herein is only one possible embodiment.)

Figure 11:
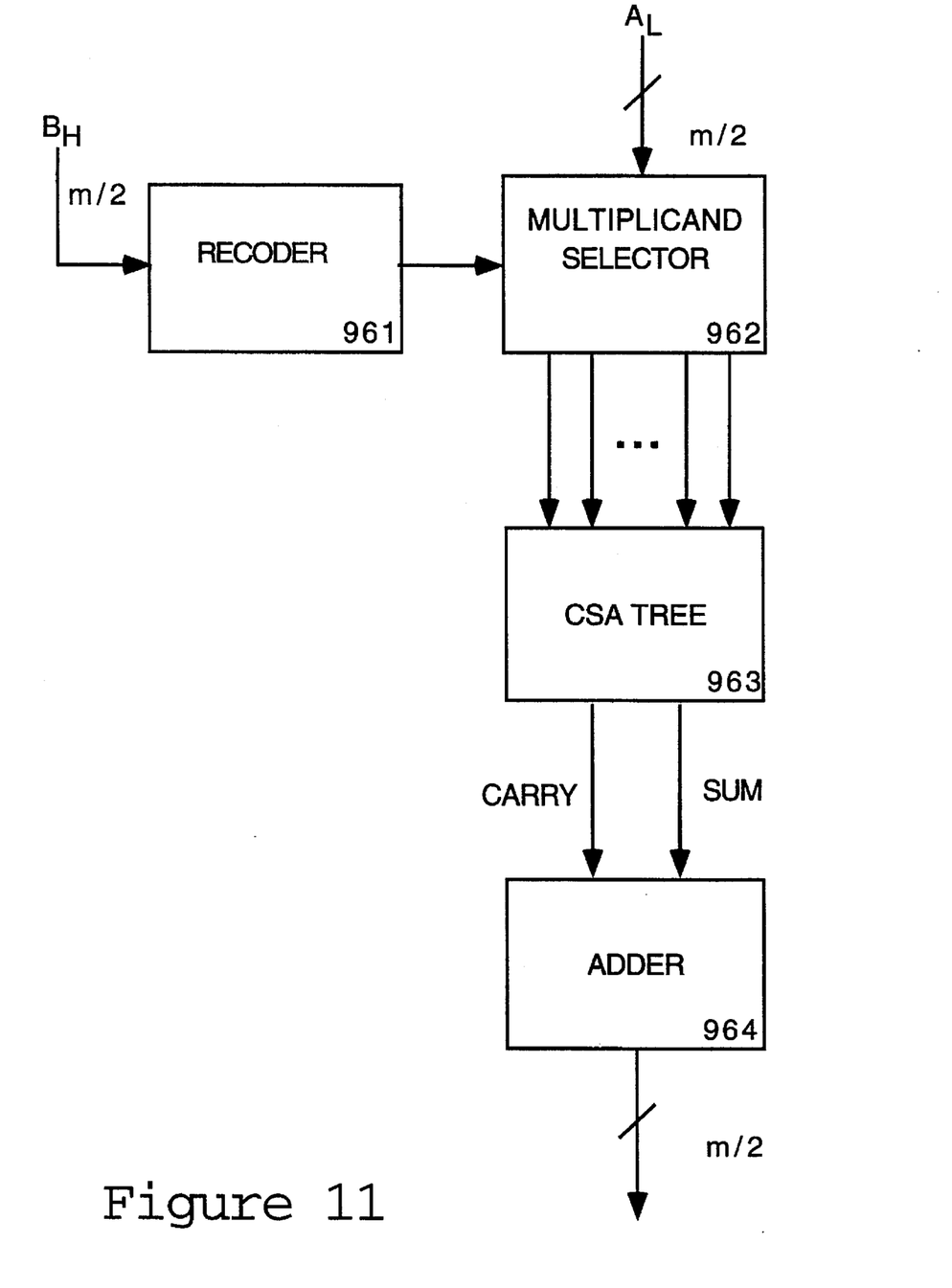
FIG. 11 is a block diagram of the least significant half generator of the present invention.

During a first state, the present invention multiplies the multiplicand A by the recoded version of $B_L$ in the multiplicand selector 802. Passing the results of that multiplication to adder tree 803 and parallel adder 805 results in the 3 m/2-bit partial product $PP_1$ (step 951). A least significant half generator 804, as shown in detail in FIG. 11, generates a partial product $PP_2$, which represents the least significant m/2 bits of the product $B_H \times A_L$ (step 952). The generator 804 multiplies $A_L$, the least significant m/2 bits of the multiplicand, by $B_H$, the most significant m/2 bit of the multiplier, and produces the least significant m/2 bits of the product. Thus, the least significant half generator 804 is an m/2×m/2-bit multiplier. However, generator 804 has approximately half as much hardware as a full m/2×m/2-bit multiplier because generator 804 produces only the least significant m/2 bits of the product, whereas a full m/2×m/2-bit multiplier generates all m-bits of the product. In the embodiment of FIG. 11, the generator 804 is shown using the same modified Booth recoding technique as the other multipliers, but other techniques may be used as well.

The m/2 bits of $PP_2$ are aligned in the adder tree 803 so that the middle m/2 bits of $PP_1$ are added to $PP_2$ (step 953). This addition produces a partial product $PP_3$ at the end of the first pass through the multiplier (step 954). As noted above, the least significant m/2 bits of $PP_1$, and thus of $PP_3$, are valid. The addition of $PP_2$ to the middle m/2 bits of $PP_1$ renders the middle m/2 bits of $PP_3$ valid as well. As a result, out of the total 3 m/2 bits of $PP_3$ produced in the first pass of the multiplier, the least significant m bits of $PP_3$ are valid and represent the least significant half of the final product. These m valid bits are transferred to the m-bit result bus through the output driver 806 (step 955).

The second pass through the multiplier produces the most significant m-bits of the final product A×B. The most significant m bits of the partial product $PP_3$ are fed into a feedback latch 807 to be transferred to the adder tree 803. Selecting the most significant m bits effectively shifts $PP_3$ right by m/2 bits and truncates $PP_3$, discarding the least significant m/2 bits (step 956). Through this operation, the most significant m bits of $PP_3$ are aligned with the least significant m bits of the product $B_H \times A = PP_4$, which is produced during the second step by the recoding of $B_H$ in recoder 801 and the application of the recoded result to multiplicand A in multiplicand selector 802. The shifted version of $PP_3$ and $PP_4$ must be added together to obtain the most significant m bits of the final product during the second state. Before carrying out this addition, $PP_3$ (shifted) must be sign extended to obtain the correct sum (step 957). The sign extension depends on the signs (the most significant bits) of $PP_1$ and $PP_3$. Except in the case that $PP_1$ is positive and $PP_3$ is negative, the m/2 bits of the sign extension take the same value as the most significant bit (MSB) of $PP_3$. However, when MSB(PP$_1$)=0 and MSB(PP$_3$)=1, this condition indicates that the sum of PP$_1$ and PP$_2$ created an overflow into MSB(PP$_3$). To correct for this intermediate overflow, the sign extension bits are all set to "0"(positive). Adaptation of this system for multiplication of unsigned operands is obvious to one skilled in the art and need not be described in detail here. Sign extension is implemented by logic that resides in feedback latch 807.

Another feature of the invention accounts for the fact that PP$_3$ is the sum of B$_L$×A and the least significant m/2 bits of B$_H$×A$_L$. Thus, if PP$_4$=B$_H$×A is added to PP$_3$, then PP$_2$ is being added in the final product twice through the addition of the least significant m/2 bits of PP$_3$ shifted right by m/2 bits and the least significant m/2 bits of PP$_4$, thereby producing an incorrect result. This problem is solved by aligning PP$_2$ with the least significant m/2 bits of PP$_4$ in the adder tree 803 and subtracting PP$_2$ before or after adding PP$_4$ (step 958). (The alignment of the bits is performed in the adder tree 803 by feeding the addends to the appropriate bits for alignment.) Consequently, at the end of the second pass through the multiplier, 3 m/2 bits are generated as PP$_5$, of which the most significant m bits are valid and correspond to the most significant m-bits of the final product. These m bits are picked off in adder 805, effectively shifting PP$_5$ by m/2 bits to the right and discarding the rightmost m/2 bits (step 959). The m-bit valid most significant half of the final product A×B is then transferred to the result bus through driver 806 (step 960). The logical control of the components of the present invention through both states is implemented by a state machine 808, which issues control signals received by the components of the apparatus.

Thus, the present invention achieves fast m-bit by ×m-bit multiplication in only two states, thereby achieving the same performance as the multiplication scheme of FIG. 4. However, the present invention achieves this performance with substantially fewer hardware components than the scheme of FIG. 4, and with only slightly more components than the m-bit×m/2-bit scheme of FIG. 5 which requires four states to perform full multiplication. In quantitative terms, assuming that scheme 1 (that of FIG. 4) uses X number of devices, then scheme 2 (that of FIG. 5) uses approximately X/2 devices and scheme 3 (that of FIG. 7) uses approximately X/4 devices. The present invention, however, uses only approximately X/2+½(X/4)=5X/8 devices, nearly 40% fewer devices than scheme 1, while providing the same performance. Consequently, the present invention provides maximum performance while minimizing the area occupied on silicon.

Although the invention has been described in conjunction with particular embodiments, it will be appreciated that various modifications and alterations might be made by those skilled in the art without departing from the spirit and scope of the invention.

I claim:

1. An apparatus for multiplying an m-bit multiplicand A by an m-bit multiplier B to produce a 2 m-bit final product A×B, the multiplicand A having a most significant m/2 bits denoted by A$_H$ and a least significant m/2 bits denoted by A$_L$, the multiplier B having a most significant m/2 bits denoted by B$_H$ and a least significant m/2 bits denoted by B$_L$, the apparatus comprising:

means for producing a first product A×B$_L$ having 3m/2 bits comprising a most significant m/2 bits, a middle m/2 bits, and a least significant m/2 bits;

means for generating the least significant m/2 bits of a product A$_L$×B$_H$;

means for choosing the least significant m/2 bits of said product A$_L$×B$_H$ to produce a second product;

means for adding the second product to the middle m/2 bits of the first product to produce a third product having 3 m/2 bits, wherein the least significant m bits of the third product are the least significant m bits of the final product;

means for selecting the most significant m bits of the third product and shifting the most significant m bits selected into the position of the least significant bits to produce a shifted third product;

means for subtracting the m/2 bits of second product from the shifted third product to produce a first difference comprising at least m bits;

means for producing a fourth product A×B$_H$ comprising 3m/2 bits;

means for adding the fourth product to the first difference to produce a fifth product comprising 3m/2 bits, wherein the most significant m bits of the fifth product are the most significant m bits of the final product; and a control unit for controlling the operation of said apparatus.

2. An apparatus for multiplying an m-bit multiplicand A by an m-bit multiplier B to produce a 2 m-bit final product A×B, the multiplicand A having a most significant m/2 bits denoted by AH and a least significant m/2 bits denoted by AL, the multiplier B having a most significant m/2 bits denoted by BH and a least significant m/2 bits denoted by BL, the apparatus comprising:

least significant half generating means for receiving AL and BH, said least significant half generating means producing a an m bit product of AL and BH and selecting the least significant m/2 bits of the product of AL and BH to produce a second product;

feedback latching means for storing m bits as a feedback word;

first multiplying means for receiving the multiplicand A and the multiplier B, and:

in a first state, multiplying A by BL to produce a first product having 3 m/2 bits; and in a second state, multiplying A by BH to produce a fourth product having 3 m/2 bits;

adding means coupled to said feedback latching means and to said least significant half generating means, said adding means:

in the first state, adding the second product to the middle m/2 bits of the first product to produce a third product having 3 m/2 bits, wherein the least significant m bits of the third product are the least significant m bits of the final product and the most significant m bits are output to the feedback latching means to be stored as the feedback word;

in the second state, receiving the feedback word from said feedback latching means, subtracting the second product from the feedback word to produce a first difference comprising at least m bits, and adding the fourth product to the first difference to produce a fifth product comprising 3 m/2 bits, wherein, the most significant m bits of the fifth product are the most significant m bits of the final product.

3. The apparatus of claim 2, wherein said least significant half generating means comprises:

recoding means for receiving B$_H$ and for providing a recoded output;

multiplicand selector means for receiving A$_L$ and coupled to said recoding means for receiving said recoded output, for producing a plurality of partial products;

adder tree means coupled to said multiplicand selector means for receiving said partial products and for producing a carry and a sum word; and parallel adding means coupled to said adder tree means for receiving said carry and sum words and for producing said second product.

4. The apparatus of claim 2, wherein said first multiplying means includes said adding means.

5. The apparatus of claim 4, wherein said first multiplying means comprises:

recoding means for receiving the multiplier B and for providing a recoded output;

multiplicand selector means for receiving said multiplicand A and coupled to said recoding means for receiving said recoded output, and for producing a plurality of partial products;

adder tree means coupled to said multiplicand selector means for receiving said partial products, to said least significant half generating means for receiving said second product, and to said feedback latching means for receiving said feedback word to produce a carry word and a sum word; and parallel adding means coupled to said adder tree means for receiving said carry and sum words and coupled to said feedback latching means for providing the most significant m bits of the third product to said feedback latching means.

6. The apparatus of claim 2, wherein said feedback latching means further comprises extension logic means for:

setting each of a plurality of m/2 extension bits to "0" if the most significant bit of the first product is "0" and the most significant bit of the third product is "1", otherwise setting each said extension bit to the value of the most significant bit of the third product, and appending said m/2 extension bits to the most significant m bits of the third product to produce the feedback word.

7. The apparatus of claim 2, said apparatus being coupled to a result bus, wherein said adding means further comprises:

bus driving means for:

in the first state, transferring the least significant m bits of the final product to the result bus, and in the second state, transferring the most significant m bits of the final product to the result bus.

8. An apparatus for multiplying an m-bit multiplicand A by an m-bit multiplier B to produce a 2m-bit final product A×B, the multiplicand A having a most significant m/2 bits denoted by AH and a least significant m/2 bits denoted by AL, the multiplier B having a most significant m/2 bits denoted by BH and a least significant m/2 bits denoted by BL, the apparatus comprising:

a least significant half generator coupled to receive AL and BH, said generator producing an m bit product of AL and BH and selecting the least significant m/2 bits of the product of AL and BH to produce a second product;

a feedback latch to store m bits as a feedback word;

a first multiplier coupled to receive the multiplicand A and the multiplier B, said first multiplier:

in a first state, multiplying A by BL to produce a first product having 3 m/2 bits; and in a second state, multiply A by BH to produce a fourth product having 3 m/2 bits;

an adder coupled to said feedback latches and to said least significant half generator, said adder:

in the first state adding the second product to the middle m/2 bits of the first product to produce a third product having 3 m/2 bits, wherein the least significant m bits of the third product are the least significant m bits of the final product and the most significant m bits are output to the feedback latching means to be stored as the feedback word;

in the second state, receiving the feedback word from said feedback latch, and substracting the second product from the feedback word to produce a first difference comprising at least m bits, and adding the fourth product to the first difference to produce a fifth product comprising 3 m/2 bits, wherein the most significant m bits of the fifth product are the most significant m bits of the final product; and a control unit coupled to the least significant half generator, the feedback latch, the first multiplier and the adder to provide control signals.

9. The apparatus of claim 8, wherein said least significant half generator comprises:

a recoder to receive BH and to provide a recoded output;

a multiplicand selector to receive AL and coupled to said recoder to receive said recoded output, for producing a plurality of partial-products;

an adder tree coupled to said multiplicand selector to receive said partial products, and for producing a carry and a sum word; and a parallel adder coupled to said adder tree to receive said carry and sum words and for producing said second product.

10. The apparatus of claim 8, wherein said first multiplier includes said adder.

11. The apparatus of claim 10, wherein said first multiplier comprises:

a recoder to receive the multiplier B and to provide a recoded output;

a multiplicand selector to receive said multiplicand A and coupled to said recoder to receive said recoded output, to produce a plurality of partial products;

an adder tree coupled to said multiplicand selector to receive said partial products, to said least significant half generator to receive said second product, and to said feedback latch to receive said feedback word to produce a carry word and a sum word; and a parallel adder coupled to said adder tree to receive said carry and sum words and coupled to said feedback latch to provide the most significant m bits of the third product to said feedback latch.

12. The apparatus of claim 8, wherein said feedback latch further comprises an extension logic circuit to:

set each of a plurality of m/2 extension bits to "0" if the most significant bit of the first product is "0" and the most significant bit of the third product is "1", otherwise set each said extension bit to the value of the most significant bit of the third product, and append said m/2 extension bits to the most significant m bits of the third product to produce the feedback word.

13. The apparatus of claim 8, said apparatus being coupled to a result bus, wherein said adder further comprises:

a bus driver, which, in the first state, transfers the least significant m bits of the final product to the result bus, and

11 in the second state, transfers the most significant m bits of the final product to the result bus.

14. In a computer system, a method for multiplying an m-bit multiplicand A by an m-bit multiplier B to produce a final product A×B, the multiplicand A having a most significant m/2 bits denoted by AH and a least significant m/2 bits denoted by AL, the multiplier B having a most significant m/2 bits denoted by BH and a least significant m/2 bits denoted by BL, the method comprising the steps of:

said computer producing a first product A×BL having 3 m/2 bits comprising a most significant m/2 bits, a middle m/2 bits, and a least significant m/2 bits;

said computer choosing the least significant m/2 bits of a product AL×BH to produce a second product;

said computer adding the second product to the middle m/2 bits of the first product to produce a third product having 3 m/2 bits, wherein the least significant m bits of the third product are the least significant m bits of the final product;

said computer selecting the most significant m bits of the third product and shifting the most significant m bits selected into the position of the least significant bits to produce a shifted third product;

said computer subtracting the second product from the shifted third product to produce a first difference comprising at least m bits;

said computer producing a fourth product A×BH comprising 3 m/2 bits;

said computer adding the fourth product to the first difference to produce a fifth product comprising 3m/2 bits, wherein the most significant m bits of the fifth product are the most significant m bits of the final product.

15. The method of claim 14, further comprising the steps of:

said computer transferring the least significant m bits of the final product to a result bus; and said computer transferring the most significant m bits of the final product to the result bus.

16. The method of claim 14, said selecting step further comprising the steps of:

setting each of a plurality of m/2 extension bits to "0" if the most significant bit of the first product is "0" and the most significant bit of the third product is "1";

otherwise setting each said extension bit to the value of the most significant bit of the third product; and appending said m/2 extension bits to the most significant m bits of the third product to produce the shifted third product.

17. A system comprising:

main memory means for storing information;

bus means for coupling said main memory means to said processing means; and a processing means for processing information, said processing means including:

multiplication means coupled to the processing means for multiplying an m-bit multiplicand A by an m-bit multiplier B provided by the processing means to produce a final product A×B, the multiplicand A having a most significant m/2 bits denoted by AH and a least significant m/2 bits denoted by AL, the multiplier B having a most significant m/2 bits denoted by BH and a least significant m/2 bits denoted by BL, said multiplication means comprising:

means for producing a first product A×BL having 3 m/2 bits

12 comprising a most significant m/2 bits, a middle m/2 bits, and a least significant m/2 bits;

means for choosing the least significant m/2 bits of a product AL×BH to produce a second product;

means for adding the second product to the middle m/2 bits of the first product to produce a third product, wherein the least significant m bits of the third product are the least significant m bits of the final product;

means for selecting the most significant m bits of the third product having 3 m/2 bits, and shifting the most significant m bits selected into the position of the least significant bits to produce a shifted third product;

means for subtracting the second product from the shifted third product to produce a first difference comprising at least m bits;

means for producing a fourth product A×BH comprising 3m /2 bits;

means for adding the fourth product to the first difference to produce a fifth product comprising 3 m/2 bits, wherein the most significant m bits of the fifth product are the most significant m bits of the final product; and a control unit for controlling the operation of said multiplication means.

18. The system of claim 17, wherein said processing means comprises an arithmetic logic means for performing arithmetic and logical operations, said arithmetic logic means including said multiplication means.

19. The system of claim 17, wherein said processing means comprises:

floating point means for performing floating point operations, said floating point means including said multiplication means.

20. The system of claim 17, wherein said processing means further comprises:

integer multiplication/division means for performing integer multiplication and division, said integer multiplication/division means including said multiplication means.

21. A system comprising:

processing means for processing information;

main memory means for storing information;

bus means for coupling said main memory means to said processing means; and multiplication means coupled to the processing means for multiplying an m-bit multiplicand A by an m-bit multiplier B provided by the processing means to produce a 2 m-bit final product A×B, the multiplicand A having a most significant m/2 bits denoted by AH and a least significant m/2 bits denoted by AL, the multiplier B having a most significant m/2 bits denoted by BH and a least significant m/2 bits denoted by BL, said multiplication means comprising:

least significant half generating means for receiving AL and BH, and for selecting the least significant m/2 bits of the product AL×BH to produce a second product;

feedback latching means for storing a feedback word;

first multiplying means for receiving the multiplicand A and the multiplier B, and:

in a first state, multiplying A by BL to produce a first product having 3 m/2 bits; and in a second state, multiplying A by BH to produce a fourth product having 3 m/2 bits;

adding means coupled to said feedback latching means and to said least significant half generating means, said adding means:

in the first state, adding the second product to the middle m/2 bits of the first product to produce a third product having 3 m/2 bits, wherein the least significant m bits of the third product are the least significant m bits of the final product and the most significant m bits are output to the feedback latching means to be stored as the feedback word;

in the second state, receiving the feedback word from said feedback latching means, subtracting the second product from the feedback word to produce a first difference comprising at least m bits, and adding the fourth product to the first difference to produce a fifth product comprising 3 m/2 bits, wherein the most significant m bits of the fifth product are the most significant m bits of the final product; and state control means for controlling the operation of the least significant half generating means, the feedback latching means, the first multiplying means and the adding means in the first and second states, said state control means being coupled to and providing control signals to the least significant half generating means, the feedback latching means, the first multiplying means and the adding means.

22. The system of claim 21, said system further comprising: graphic output means for displaying graphics, said graphic output means having a plurality of display locations identified by display addresses; and graphic control means coupled to said graphic output means for controlling said graphic output means, said graphic control means including said multiplication means for calculating said display addresses.

23. The system of claim 21, further comprising arithmetic coprocessing means coupled to said processing means and said bus means for performing arithmetic operations, said arithmetic coprocessing means including said multiplication means.

24. The system of claim 21, wherein said first multiplying means includes said adding means.

25. The system of claim 21, wherein said feedback latching means further comprises extension logic means for:

setting each of a plurality of m/2 extension bits to "0" if the most significant bit of the first product is "0" and the most significant bit of the third product is "1", otherwise setting each said extension bit to the value of the most significant bit of the third product, and appending said m/2 extension bits to the most significant m bits of the third product to produce the feedback word.

26. The system of claim 21, said apparatus being coupled to a result bus, wherein said adding means further comprises:

bus driving means for:

in the first state, transferring the least significant m bits of the final product to the result bus, and in the second state, transferring the most significant m bits of the final product to the result bus.

27. A system comprising:

a processor;

a main memory;

a bus coupling said main memory to said processor; and a multiplication apparatus generating a 2 m-bit final product A×B of an m-bit multiplicand A and an m-bit multiplier B provided by the processor, the multiplicand A having a most significant m/2 bits denoted by AH and a least significant m/2 bits denoted by AL, the multiplier B having a most significant m/2 bits denoted by BH and a least significant m/2 bits denoted by BL, the apparatus comprising:

a least significant half generator coupled to receive AL and BH, said generator producing a 3 m/2 product of AL and BH and selecting the least significant m/2 bits of the product of AL and BH to produce a second product;

a feedback latch coupled to store a most significant m bits of a third product as a feedback word;

a first multiplier coupled to receive the multiplicand A and the multiplier B, said first multiplier:

in a first state, multiply A by BL to produce a first product having 3 m/2 bits; and in a second state, multiply A by BH to produce a fourth product having 3 m/2 bits;

an adder coupled to said feedback latches and to said least significant half generator, said adder:

in the first state, adding the second product to the middle m/2 bits of the first product to produce a third product having 3m/2 bits, wherein the least significant m bits of the third product are the least significant m bits of the final product and the most significant m bits are output to the feedback latching means to be stored as the feedback word;

in the second state, receiving the feedback word from said feedback latch, and subtracting the second product from the feedback word to produce a first difference comprising at least m bits, and adding the fourth product to the first difference to produce a fifth product comprising m bits, wherein the most significant m bits of the fifth product are the most significant m bits of the final product; and a control unit coupled to the least significant half generator, the feedback latch, the first multiplier and the adder to provide control signals.

28. The system of claim 27, said system further comprising:

a graphic output unit for displaying graphics, said graphic output unit having a plurality of display locations identified by display addresses; and a graphic control unit coupled to said graphic output unit for controlling said graphic output unit said graphic control unit including said multiplication apparatus to calculate said display addresses.

29. The system of claim 27, further comprising an arithmetic coprocessor coupled to said processor and said bus to perform arithmetic operations, said arithmetic coprocessor including said multiplication apparatus.

30. The system of claim 27, wherein said first multiplier includes said adder.

31. The system of claim 27, wherein said feedback latch further comprises an extension logic circuit to:

set each of a plurality of m/2 extension bits to "0" if the most significant bit of the first product is "0" and the most significant bit of the third product is "1", otherwise set each said extension bit to the value of the most significant bit of the third product, and append said m/2 extension bits to the most significant m bits of the third product to produce the feedback word.

32. The system of claim 27, said multiplication apparatus being coupled to a result bus, wherein said adder further comprises:

a bus driver in the first state, transferring the least significant m bits of the final product to the result bus, and in the second state, transferring the most significant m bits of the final product to the result bus.

33. The system of claim 27, wherein said first multiplier includes said adder.

34. The system of claim 27, wherein said feedback latch further comprises an extension logic circuit to:

set each of a plurality of m/2 extension bits to "0" if the most significant bit of the first product is "0" and the most significant bit of the third product is "1", otherwise set each said extension bit to the value of the most significant bit of the third product, and append said m/2 extension bits to the most significant m bits of the third product to produce the feedback word.

\* \* \* \* \*

UNITED STATES PATENT AND TRADEMARK OFFICE
CERTIFICATE OF CORRECTION

PATENT NO.    :   5,623,683
DATED         :   April 22, 1997
INVENTOR(S)   :   Ashish Pandya It is certified that error appears in the above-identified patent and that said Letters Patent is hereby corrected as shown below:

In column 10 at line 11 delete "substracting" and insert --subtracting--

Signed and Sealed this

Twelfth Day of August, 1997

Attest:

BRUCE LEHMAN

Attesting Officer

Commissioner of Patents and Trademarks